(12) United States Patent
Lurtz et al.

(10) Patent No.: US 8,321,320 B1
(45) Date of Patent: Nov. 27, 2012

(54) PORTFOLIO MANAGEMENT ANALYSIS SYSTEM AND METHOD

(75) Inventors: Cheryll Lurtz, Olathe, KS (US); Sheryl Rowling, San Diego, CA (US)

(73) Assignee: FNA, LLC, San Diego, CA (US)

( * ) Notice: Subject to any disclaimer, the term of this patent is extended or adjusted under 35 U.S.C. 154(b) by 159 days.

(21) Appl. No.: 12/769,492

(22) Filed: Apr. 28, 2010

(51) Int. Cl.
*G06Q 40/00* (2012.01)

(52) U.S. Cl. .................................... 705/36 R

(58) Field of Classification Search .............. 705/35–45
See application file for complete search history.

(56) References Cited

U.S. PATENT DOCUMENTS 7,809,624 B1 * 10/2010 Smith et al. ............ 705/36 R

\* cited by examiner

*Primary Examiner* — Thomas M Hammond, III

(74) *Attorney, Agent, or Firm* — DLA Piper LLP (US)

(57) ABSTRACT

An analysis system and method are provided in which out-of-bound accounts can be easily identified and rebalanced.

20 Claims, 16 Drawing Sheets

TempTLH
- UserID
- TradeID
- HouseHold
- AccountNumber
- MinTrans
- Custodian
- Restricted
- RestrictedPlan
- Symbol
- FundSellFlag
- RedemptionPenaltyFlag
- OriginalTradeDate
- Quantity
- SymbolCode
- CurrentPrice
- UnitCost

TempTLHFund
- UserID
- HouseHold
- Symbol
- SumTotalLoss
- SumAvailLoss
- SumAvailLossNet
- Notes
- WashSaleFlag
- SumFund
- SumSharesTotalSell
- SumSharesAvailSell
- SumSharesAv
- upsize_ts
- MarketValue
- CostBasis

CPHousehold
- HouseHold
- Description
- AssetAllocationModel

HOUSEHOLD / TAX LOSS HARVESTING SCHEMA

FIG. 15

FIG. 16 HOUSEHOLD ANALYSIS EXPERT SCHEMA

PORTFOLIO MANAGEMENT ANALYSIS SYSTEM AND METHOD

FIELD

The disclosure relates generally to a portfolio management analysis system and method.

BACKGROUND

In the investment management world, it is desirable to be able to effectively manage multiple client accounts and portfolios. The most important aspect of that management is for a registered investment advisor (RIA) to determine if a portfolio of a particular client requires one or more transactions to maintain the particular client's investment strategy. The RIA needs to understand if the portfolio of the particular client is out-of-balance, meaning that the particular client needs to sell certain investments and buy other investments in order to bring the portfolio back to the desired asset allocation, if the portfolio of the particular client needs cash in the portfolio or has excess cash in the portfolio, meaning that cash needs to be generated or cash needs to be invested and/or the particular client has an opportunity for tax loss harvesting, meaning that one or more positions can be sold to generate a tax loss. Systems and software exist that help to automate one or more of these processes. These existing systems include iRebal and Tamarac which provide other systems and methods for performing rebalancing, cash management and tax loss harvesting. These existing systems also permit multiple portfolio models, multiple custodians and family group portfolios to assist in effective management. These existing systems also provide varying degrees of tax and cost efficiency when implementing rebalancing, cash management and tax loss harvesting.

These existing systems, however, do not have the capability of providing an RIA with a customized, snapshot view of all of their clients' portfolios, enabling the RIA to quickly identify particular portfolios requiring action. Existing systems require an RIA to select an individual client portfolio, then calculate and review the particular portfolio before enabling the RIA to determine whether or not action is required. Alternatively, existing systems may allow an RIA to select for processing transactions one or more client portfolios without knowing in advance whether or not action is required. Thus, it is desirable to provide an analysis system and method that overcomes the limitations of the existing systems and it is to this end that the disclosure is directed.

BRIEF DESCRIPTION OF THE DRAWINGS

FIG. 2 illustrates an example of an analysis expert user interface of the analysis system;

FIG. 3 illustrates an example of a client account cash needs user interface of the analysis system;

FIGS. 4 and 5 illustrate an example of a client capital gain distribution avoidance user interface of the analysis system;

FIG. 6 illustrates an example of a global assumptions user interface of the analysis system;

FIG. 8 illustrates an example of an asset allocation model compliance user interface of the analysis system;

FIG. 9 illustrates an example of a tax loss harvesting user interface of the analysis system;

FIG. 11 illustrates an example of a location optimization user interface of the analysis system;

FIG. 12 illustrates an example of a preferred buy user interface of the analysis system;

FIG. 15 illustrates an example of a household/tax loss harvesting data schema of the analysis system; and FIG. 16 illustrates an example of a household data schema of the analysis system.

DETAILED DESCRIPTION OF ONE OR MORE EMBODIMENTS

The disclosure is particularly applicable to a client or hosted server based analysis system and method and it is in this context that the disclosure will be described. It will be appreciated, however, that the system and method has greater utility since it can be implemented using various different architectures as described below and may have additional features that are known and within the scope of the disclosure. Now, an example of an implementation of an embodiment of the analysis system is described to illustrate the system and the teachings of the disclosure.

Figure 1:
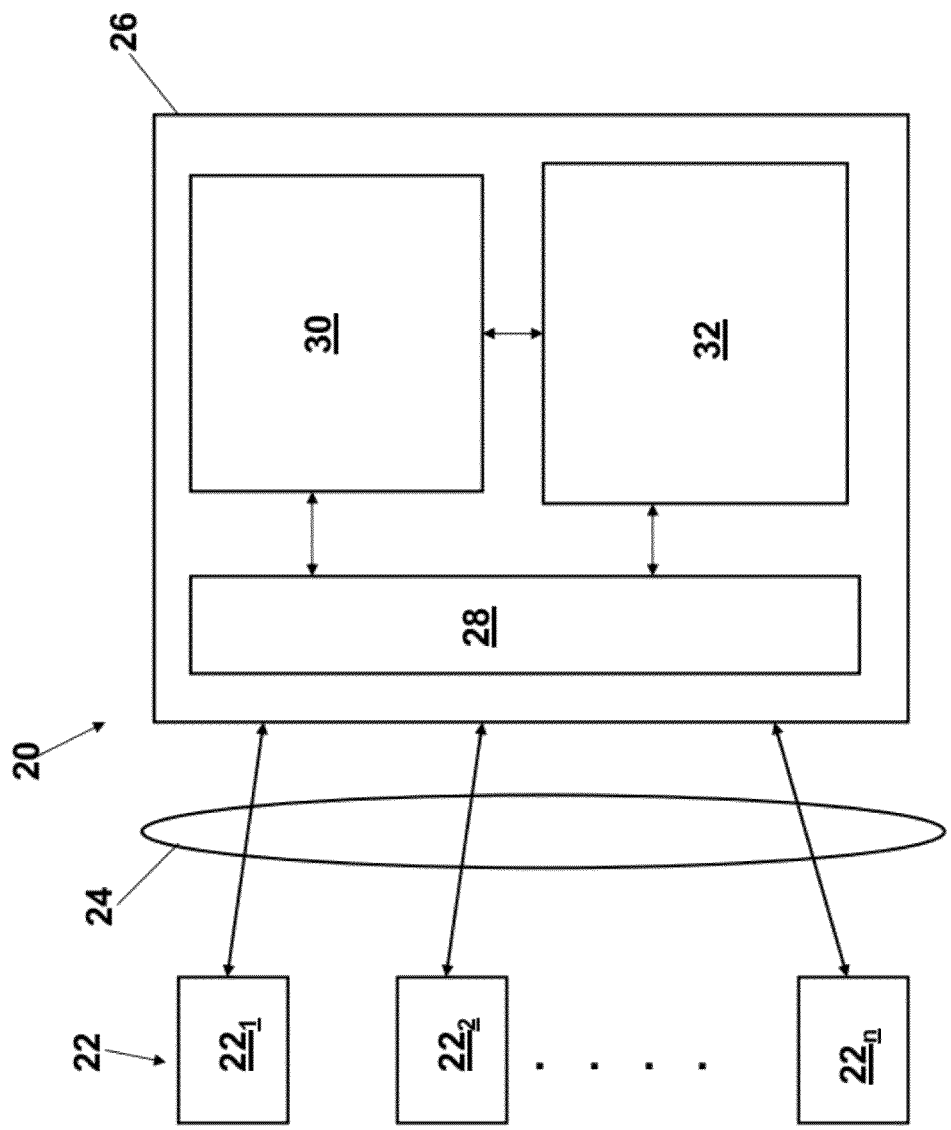
FIG. 1 illustrates an example of an implementation of an embodiment of an analysis system.

FIG. 1 illustrates an example of an implementation of an embodiment of an analysis system 20. In this implementation, a client-server type architecture is used, but the system can be implemented using other architectures as described below. In this implementation, the system has one or more computing devices 22 (such as devices $22_1, 22_2, \ldots 22n$ as shown in FIG. 1) which are used by users of the analysis system to interact with the analysis system, receive results from the analysis system and input data and/or commands into the analysis system. Each computing device may be any type of processing unit based device with sufficient processing power, one or more memories and connectivity to interact with the analysis system. For example, each computing device may be a personal computer, a laptop computer, a smartphone device (RIM Blackberry device, Apple iPhone, etc.), a mobile phone, a terminal and the like. The system 20 may further comprise a link 24 over which each computing device 22 can establish a connection (using well known secure or unsecure protocols) with and/or communicate with an analysis unit 26. The link may be, for example, the Internet, a LAN, a WAN, a wireless network, a cellular network, a digital computer network, a digital wireless data network and the like since the system is not limited to any particular type of network that provides a connection between each computing device 22 and the analysis unit 26.

The analysis unit, that may be implemented as one or more server computers at one geographic location or disparate geographic locations that execute a plurality of lines of computer code to implement the modules of the analysis unit as described below, may further comprise a web server 28 (implemented in hardware or software as is well known) that may be used in the client/server architecture shown in FIG. 1 to set up and manage communications between the computing devices using a protocol, such as HTTP or HTTPS for example, to generate forms that can be downloaded to each computing device based on the request from each computing device, to generate pages that can be downloaded to each computing device based on the request from each computing device, interacts with an analysis module 30, receive data/ command from each computing device and/or interact with a store 32 (read or write data) that contains data and information about the analysis system.

The analysis unit 26 may further comprise the analysis module 30 and the store 32 that may each be implemented in software or hardware as the system is not limited to the particular implementation of the analysis module 30 and the store 32. The analysis module 30 may perform the methods and analysis described below in detail, such as the determination that one or more accounts are out of balance and may also generate the user interface for the analysis system as shown in the diagrams and described below. The store 32 may store, in a database, table or other form of storage, account data and information associated with each account, user information for each user of the system, web pages of the analysis system, etc. wherein the data and information stored in the store may be used by the analysis module 30 and the server to, among other things, interact with each computing device.

In the client/server implementation shown in FIG. 1, the system 20 may be implemented using Microsoft® SQL® servers for database management and the one or more servers computers may have one or more processors of at least 2 GHz, 4 Gb or more of memory, at least 5 Gb of permanent storage (such as hard drives) and a Microsoft® based operating system if separate server computers in addition to the database server are used.

Although the system 20 shown in FIG. 1 is a client/server type architecture, the system 20 may also be implemented using other known or yet to be developed architectures. For example, the system 20 may be client server system hosted by the operator of the system or hosted by each client of the system, implemented using a software as a service (SaaS) model, a mainframe implementation, a peer to peer architecture, software provided on a CD that may be purchased/downloaded by a user and the like since the system 20 is not limited to any particular computer implementation of the system 20.

The analysis system 20 allows a user of the system, such as a RIA, to view at a glance which accounts of clients of the RIA ("client accounts") are out-of-balance, which client accounts need cash or have excess cash to invest, and which client accounts have an opportunity for tax loss harvesting (collectively known as accounts with an indicator of change). Without having to wait for lengthy data processing that is typical with other systems, the system 20 gives the user an instant snapshot that allows the user to identify which client accounts require transactions, thus controlling the number and timing of transactions for their client accounts.

The system 20 rebalances portfolios automatically, considering tolerance ranges, tax ramifications, location optimization, redemption fees, transaction costs, and cash needs. When determining whether or not rebalancing is necessary, the system 20 allows for a 20% variance from the target allocation percentage and the user can modify this parameter on a global, model or household level as described below in more detail. During the rebalancing, tax costs may be automatically minimized because the system 20 avoids short-term gains and will sell the highest cost tax lots within taxable accounts. When beneficial (considering costs), the system 20 may locate asset classes in order to minimize long-term tax consequences (for example, holding fixed income in IRAs as opposed to taxable accounts). The system 20 may also provide, for each portfolio's proposed transactions, an option of rebalancing with or without considering location optimization.

The system 20 may also identify accounts that require cash as well as accounts that have excess cash to be invested. The user has the option to merely cover the cash needed/invest excess cash or integrate cash transactions within a complete rebalance. When calculating transactions, the system 20 automatically considers tax ramifications and all suggested trades are structured in the most tax-efficient manner.

The system 20 simultaneously integrates multiple variables in order to arrive at the optimal transactions considering asset allocation strategy, tax efficiency and transaction costs. Specifically, the system 20 may:

- Avoid short-term capital gains
- Avoid wash sales
- Minimize gain recognition
- Limit gains/taxes to Advisor-set maximum
- Optimize investment location for long-term tax minimization
- Avoid excess cash and cash shortfalls
- Increase gross and after-tax returns
- Avoid redemption fees
- Minimize transaction costs
- Combine outside accounts within managed portfolio The system 20 also may be pre-programmed with parameters used by top advisory firms and these parameters can be modified by the user of the system as desired. The specific parameters may include:

Tolerance ranges: The system 20 allows a tolerance range on the target allocation percentage of plus or minus 20%. The user of the system ("Advisor") can change this tolerance range on a global, model or household level.

Trade minimums: The system 20 sets trade minimums as the lesser of $500 or 1% of account balance. The Advisor can change minimum trade amounts on a global, household or account level.

Cash minimums and set-aside cash: The system 20 provides minimum cash of 0.25% on IRAs and Roth IRAs. Minimum cash on taxable accounts and billing accounts is set at 0.75%. The Advisor can modify minimum cash parameters at the global, household or account level. The Advisor may also enter a "set-aside" cash amount by account in order to provide for client preferences and distributions.

Tax rates: The system 20 sets the ordinary (and short-term) tax rate at 35% and the long-term capital gain rate at 15%. The Advisor can modify these rates at the global or household level.

Location optimization: The system 20 gives the Advisor complete flexibility in choosing which asset classes or subclasses are preferred to be held in various account types. The Advisor merely needs to enter to preferred account type to hold the particular class or subclass and the preferred account type from which the class or subclass should be sold. For example, the system 20 provides for location optimization between taxable accounts, deferred accounts such as IRAs and 401ks, and Roth IRAs. Additionally, the system 20 provides the Advisor with the ability to prioritize location optimization choices within account types. For asset classes or subclasses without stated location optimization parameters, the system 20 will not consider location when suggesting trades.

Client-specific parameters: The system 20 provides flexibility so that client-specific parameters can be considered. For example, the Advisor can input maximum gains and/or tax to be generated for a household within the year. Additional client-specific parameters available with the system 20 include capital loss carryforwards, set-aside cash amounts, tax rates, legacy positions, unmanaged positions, minimum trade amounts, tolerance ranges and related accounts.

Fund-specific parameters: The system 20 allows the Advisor to enter fund-specific parameters that may include redemption fee percentages and timeframes, minimum transaction requirements, and differing transaction fee amounts by custodian, as applicable.

Custodian-specific parameters: Transaction cost amounts and/or formulas can be separately entered by custodian.

The system 20 may also have a review process that can be easily customized to fit the procedures of the user of the system. The Advisor can set the number of review levels, specify functions allowed or not allowed to each employee, and define the review process for calculating, accepting, processing and submitting trades.

The system 20 may also generate reports. For example, the system 20 automatically quantifies tax benefits to clients generated from tax lot identification, tax loss harvesting, location optimization and avoidance of capital gain distributions. The tax loss harvesting reports of the system 20 summarize, at a glance, funds with tax loss harvesting opportunities at both the fund level and at the household level. Additional reports will show year-to-date realized gains and taxes incurred. This information can be viewed on an ongoing basis as well as exported in a format suitable for client presentation. Now, examples of the user interface of the analysis system and details of the methods of the analysis system are described in more detail.

Figure 2:
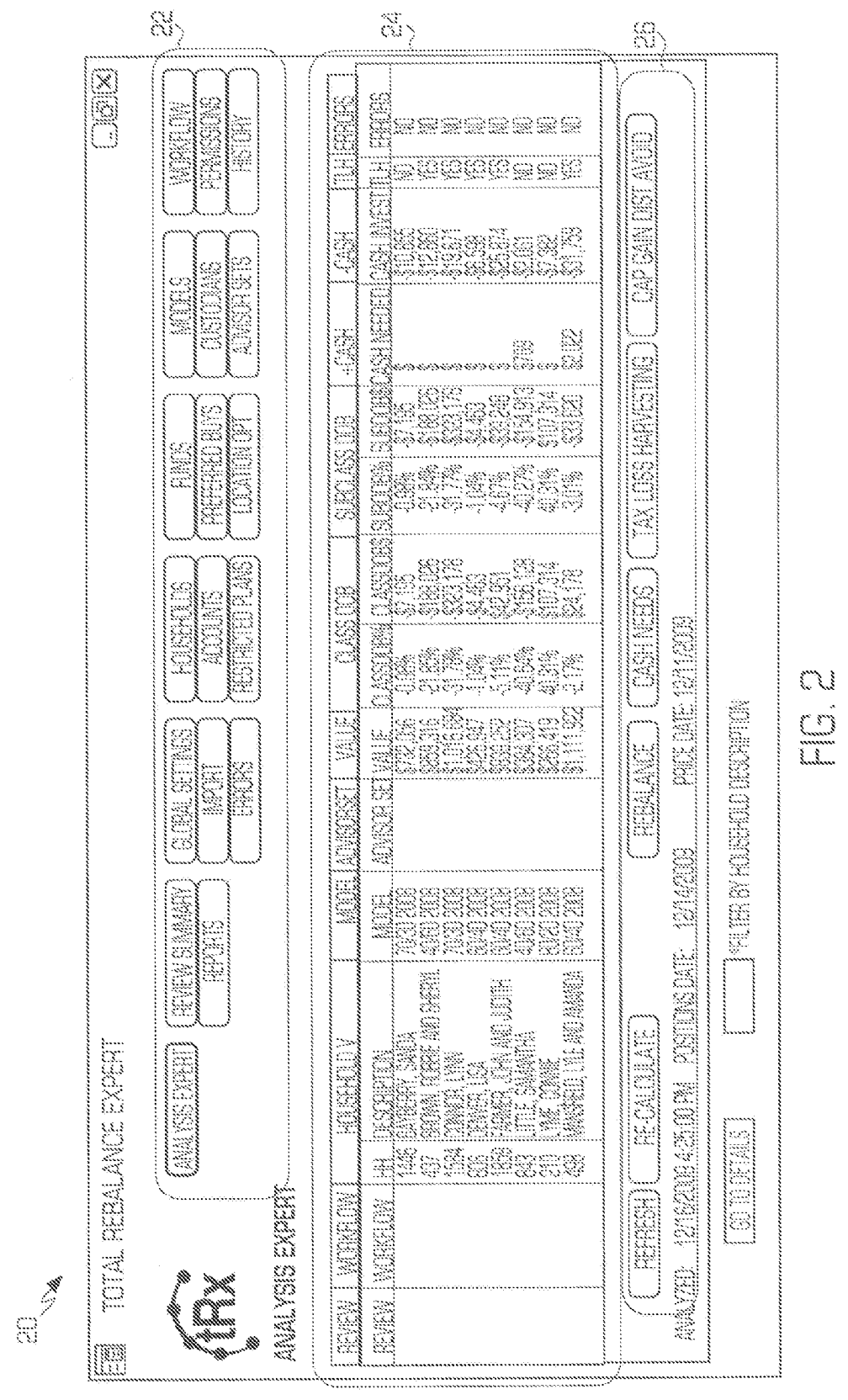

FIG. 2 illustrates an example of an analysis expert user interface 20 of the analysis system that allows the user to navigate to various functions using a set of menu buttons in a first portion 22 of the user interface. A second portion 24 of the user interface may display the selected function of the analysis system selected by the user. In FIG. 1, the selected function is the analysis expert which is shown in the second portion of the user interface.

Before a user can use the interface shown in FIG. 1, the user may input user settings and parameters. To effectively use the interface shown in FIG. 1, the user must first import PortfolioCenter (portfolio accounting system) data into the system so that the system can calculate the Analysis Expert screen shown in FIG. 1. The PortfolioCenter data is well formed XML data. The PortfolioCenter data may include account information and data, trade lots information and data, transaction history information and data, positions information and data, custodians information and data, realized gains and losses information and data, cost basis information and data, account owners information and data, social security numbers and tax ID numbers, models, accounts within each household, and other related data.

The user may then choose to sort the table by an errors column (shown at the right side of the user interface in FIG. 1) and then navigate to the errors detail and clear errors as needed. The user may then sort by Column choice (one column at a time, choice of column order by User, can also sort by Advisor set) such as: Cash Needed to identify which clients need additional cash; Cash to Invest to identify which clients have excess cash to invest; Class Out-of-Balance (OOB) to identify which clients are out-of-balance at the class level and require rebalancing; Subclass Out-of-Balance to identify which clients are out-of-balance at the subclass level and require rebalancing; Tax Loss Harvesting Opportunity to identify which clients have tax loss harvesting opportunity. The user may then choose an action (one or more clients at a time) by highlighting client and selecting Action button in an action button portion 26 of the user interface shown in FIG. 1 wherein the actions may include: Rebalance, Cash Needs, Tax Loss Harvest, Capital Gain Distribution Avoidance (and to be added Tax Loss Harvest & Rebalance) The analysis expert user interface (shown in FIG. 1) allows a user to see all clients at once, sort, and instantly identify which clients require action, then go straight to the actions for each client as needed.

Returning to FIG. 1, the components required to build the analysis expert user interface and the processes for generating the analysis expert user interface will now be described in more detail. There may be at least five components that are used to build the analysis expert user interface including: cash needs/cash to invest; a model for Class asset allocations compared to target; a model for subclass asset allocations compared to target; tax loss harvesting opportunities; and error flags. These five components may be generally known as change indicators in that certain indicators of a condition (such as, for example, a red light/green light, a Yes or No, etc.) or values (money value of the component or a percentage from a target) of these components indicate that some change in a client account should occur.

The cash needs/cash to invest may include parameters such as: 1) Cash min/max by Account; 2) Cash Set-Aside min/max by Accounts (amounts not to be included in the asset allocation model targets); 3) Household cash need determined by Asset Allocation Model target percentage; and 4) Household cash need as the sum of the Accounts' cash needs. The system may then determine cash needs/cash to invest by account in which the system determines if the Cash securities total value for an account falls within the range of minimum and maximum plus any Set-Aside amounts. If the cash amounts exceed the range plus set-aside, an Account has dollars to invest. If the cash amounts are below the range plus set-aside, an Account needs to increase its cash. The analysis system may sum the excess account cash amounts and sum the deficient account cash amounts for all Accounts within the Household and display the total excess amounts on Analysis Expert as Cash Invest (−Cash column in FIG. 1) and the total deficient amounts as Cash Need (+Cash column in FIG. 1.) This allows the Advisor to instantly identify accounts requiring cash and accounts with cash to invest. In one embodiment, the cash need is determined by one or more of the following processes executed by the analysis unit: 1) building a temporary data table for storing Cash requirements at the Household Level; 2) building a temporary data table for storing Cash requirements at the Account Level; 3) update actuals and calculate cash requirements based on Account, Household and Model parameters specified previously; 4) determining if sum of Accounts cash need exceeds the Household and Model cash needs; and 5) setting ultimate cash targets across Households.

Figure 11:
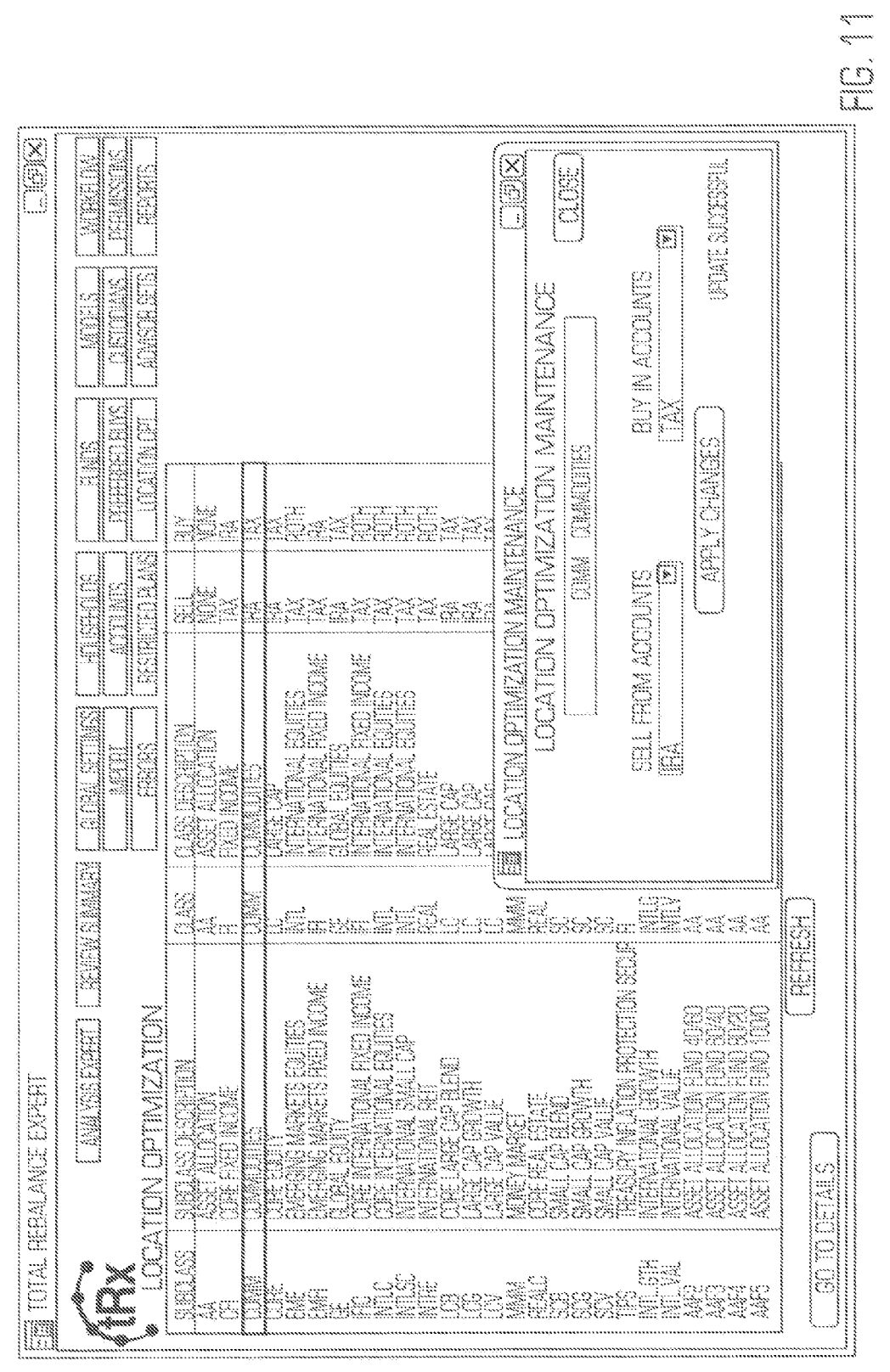

The model for Class asset allocations compared to target (which can be used to automatically calculate out of balance accounts) may define a class level for all securities held in portfolio. The user of the system determines structure of model—whether to base on class or class and sector or class, sector & subsector—when building models in Portfolio Center which are then downloaded into the system as described above. All securities must be classified to appropriate Class/Sector/Subsector, as applicable. Examples of the classes are shown in FIG. 11. The model may also automatically calculate out of tolerance range by Class based on target percentage and tolerance ranges as defined by the Household model. The model also adjusts class target percentages (the percentage of each security in a particular class for a portfolio) based on Account Cash requirements.

The model/method to determine the class out of balance accounts may include calculating a sum in dollars for each class of securities that exceed the target for the class and that fall short of the target for the class. Once the sums are calculated for all of the classes, the largest of these sums is the out of balance by Class as displayed on Analysis Expert as shown in FIG. 1 as the class OOB column. The model also calculates the largest (absolute) sum as a percentage of the total and this becomes your out of balance percentage by Class as displayed on Analysis Expert as shown in FIG. 1 as the class OOB % column. In one embodiment, the out of balance percentage and dollar amount may be determined by one or more of the following processes executed by the analysis unit: 1) building a temporary data table for storing Class values including, for example, actual versus target; 2) determining cash target and re-calculate Class target percentages accordingly; and 3) setting Out of balance percent and dollar amount by Class by Household.

The model for subclass asset allocations compared to target (which can be used to automatically calculate out of balance accounts) may define a subclass level for all securities held in portfolio. The subclass model may then automatically calculate out of tolerance ranges by Subclass based on target percentage and tolerance ranges as defined by the Household model. The model then adjusts Subclass target percentages based on Account Cash requirements.

The model/method to determine the subclass out of balance accounts may include calculating a sum in dollars for each subclass of securities that exceed the target for the subclass and that fall short of the target for the subclass. Once the sums are calculated for all of the subclasses, the largest of these sums is the out of balance by subclass as displayed on Analysis Expert as shown in FIG. 1 as the subclass OOB column. The model also calculates the largest (absolute) sum as a percentage of the total which becomes the out of balance percentage by Subclass as displayed on Analysis Expert as shown in FIG. 1 as the subclass OOB % column. In one embodiment, the out of balance percentage and dollar amount may be determined by one or more of the following processes executed by the analysis unit: 1) building a temporary data table for storing subClass values including, for example, actual versus target; 2) determining cash target and re-calculate subClass target percentages accordingly; and 3) setting Out of balance percent and dollar amount by subClass by Household.

The tax Loss Harvesting Opportunity may be determined by the system by comparing the cost basis of the securities in the portfolio to the current market value of any Trade Lot in all taxable accounts whose loss exceeds the user-defined loss percentage. In one embodiment, the tax loss harvesting opportunities may be determined by a process executed by the analysis unit that, for taxable accounts within each Household, sum the losses by Trade Lot that exceed the pre-determined loss percentage for short and long term losses.

The error flags are errors that prevent the system from automatically rebalancing the portfolio, satisfying Cash Needs, taking advantage of a tax loss harvesting opportunity, or determining Capital Gains Distribution Avoidance savings wherein the errors are flagged by Household as shown in the Errors column in the user interface of FIG. 1. The immediate recognition of an error by the system provides for quick resolution. The typical errors flag may be: Accounts without a Custodian, Subclass without a Preferred Buy, Asset Allocation Models not totaling 100%.

The above five components of Analysis Expert provide the Advisor a dash board view to quickly ascertain if all Household portfolios are within their respective Model target allocation range, if cash requirements by Account are sufficient for predetermined withdrawals, set-asides and fees or if excess cash is available for investment, and if any Household has a Tax Loss Harvesting opportunity. The Advisor can manipulate the Analysis Expert screen by sorting on Cash Need to bring those Households with the largest cash requirement unsatisfied to the top, thus determining which Households need attention. The same manipulation may be done for all key determinants and within minutes the Advisor has reviewed all Households. Once the above five components are determined, the analysis unit builds the analysis expert user interface by household by combining the results of Cash needs calculations, Class out of balance calculation, Subclass out of balance Calculations, Tax Loss Harvesting opportunities and error recognition by Household.

Figure 3:
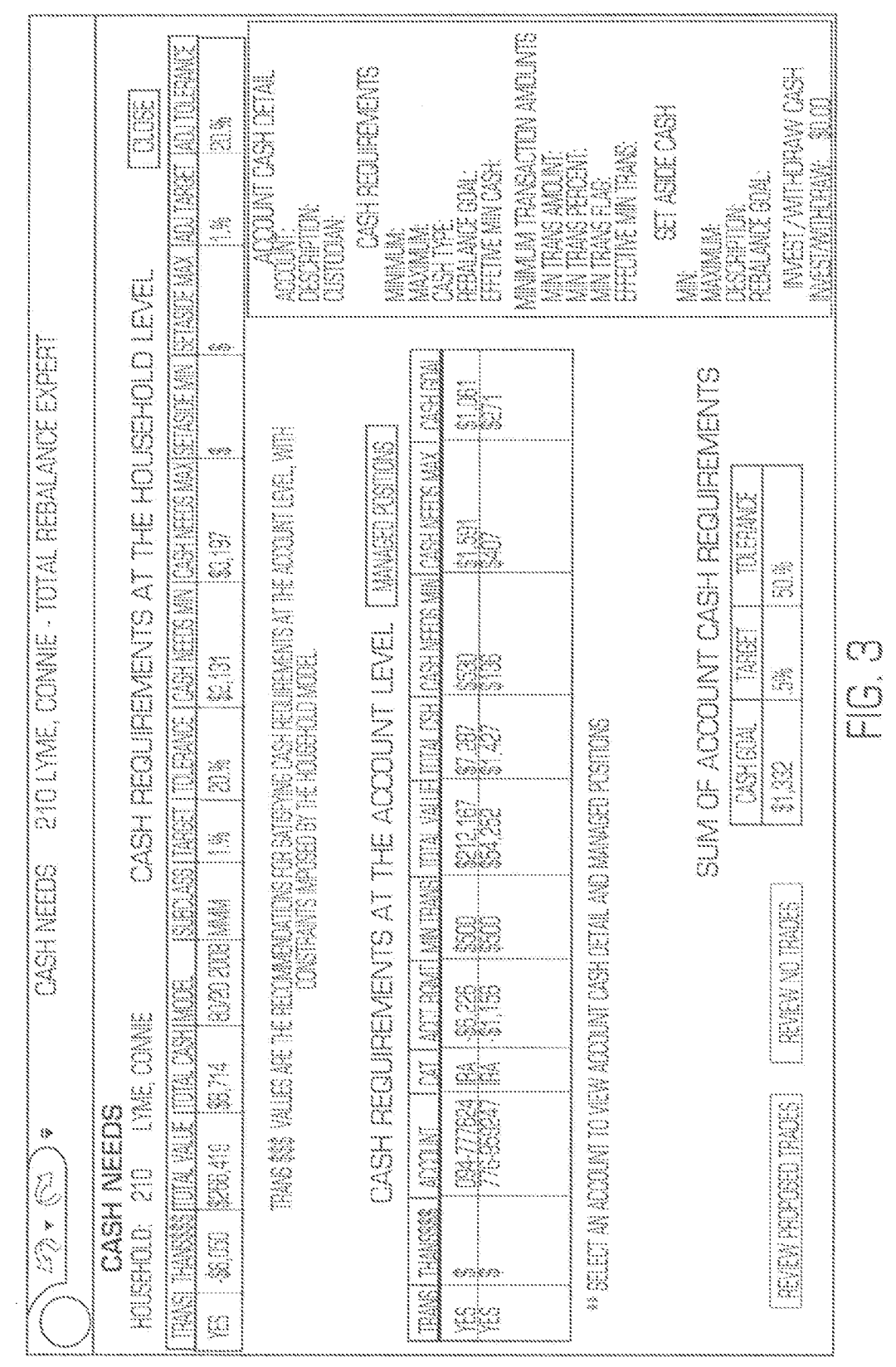

FIG. 3 illustrates an example of a client account cash needs user interface of the analysis system that allows the user to enter the cash account parameters for each portfolio. The user interface also shows the cash requirements at a household level and at an account level. This user interface allows the user of the system to adjust the cash needs for a client, by household or account, and then view the current cash requirements for a client in more detail than can be seen using the analysis expert user interface of FIG. 2.

Figure 4:
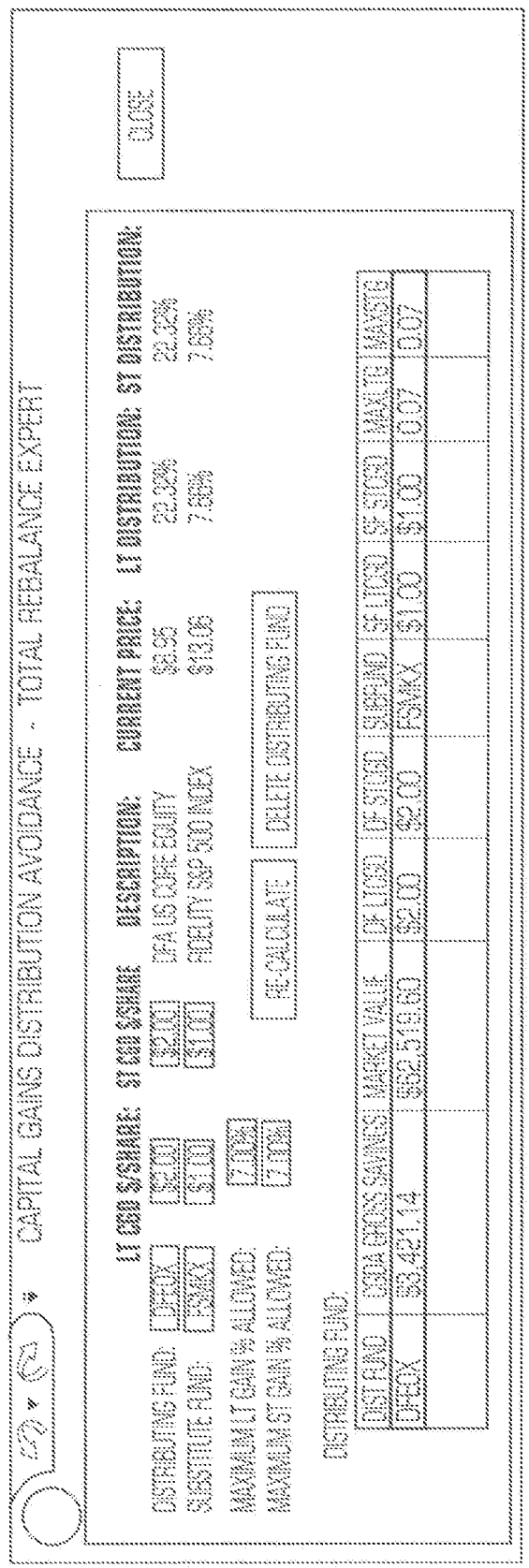
Figure 5:
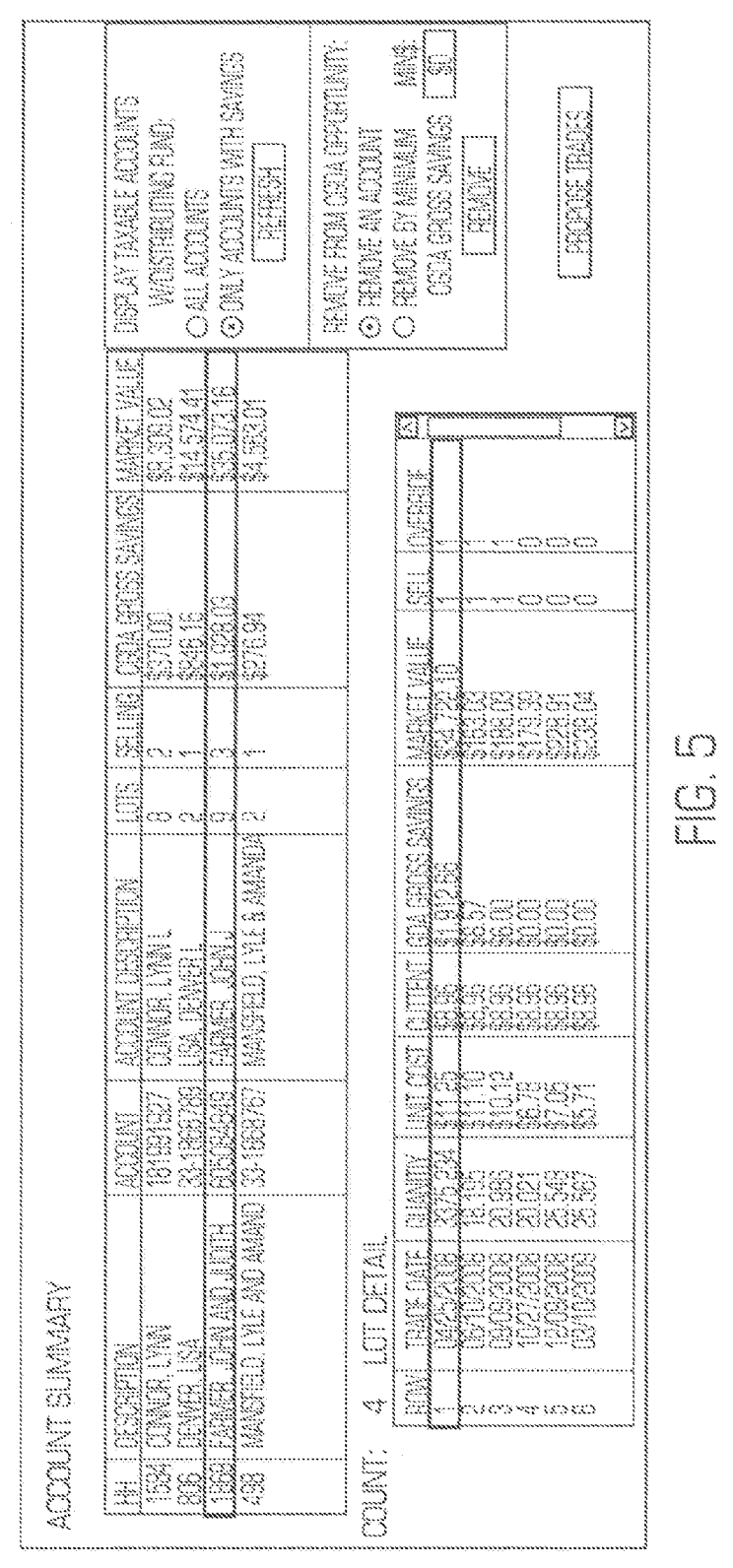

FIGS. 4 and 5 illustrate an example of a client capital gain distribution avoidance user interface of the analysis system in which a user can enter capital gain distribution avoidance criteria and view the capital gain distribution avoidance values and criteria for an account (See FIG. 5) as well as each lot of securities in the portfolio of the particular client.

Figure 6:
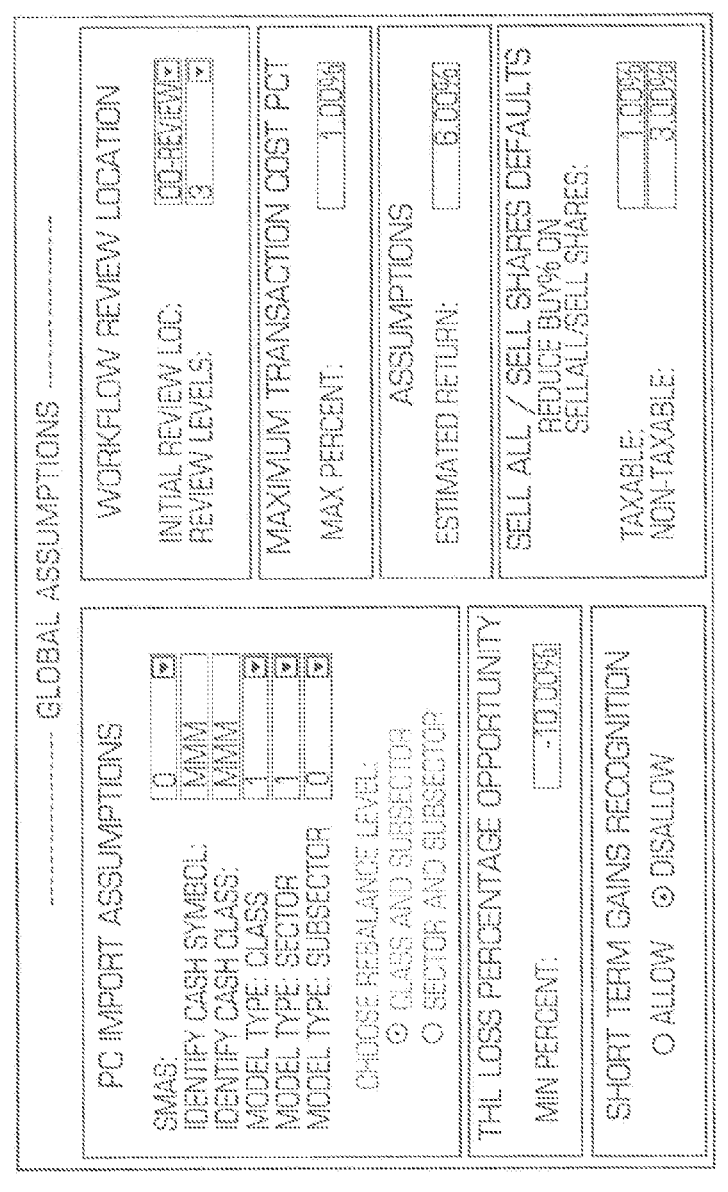
Figure 7:
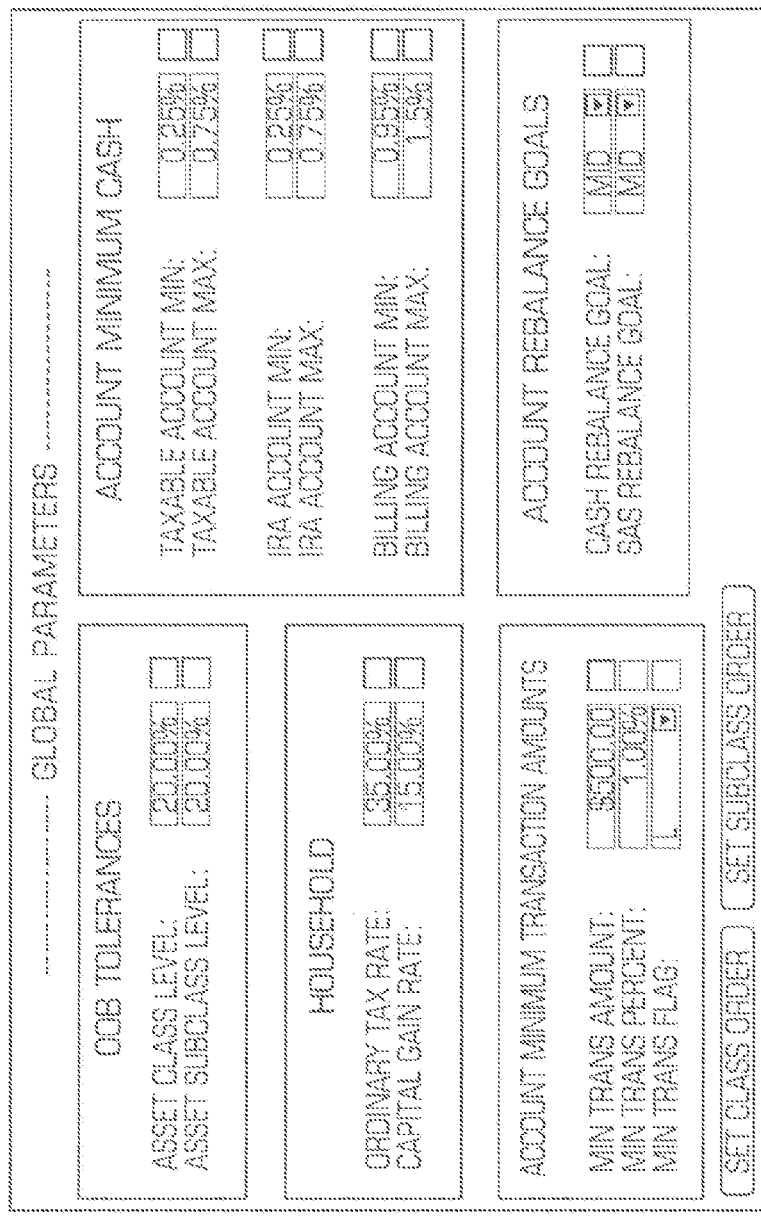
FIG. 7 illustrates an example of a global parameters user interface of the analysis system.
Figure 8:
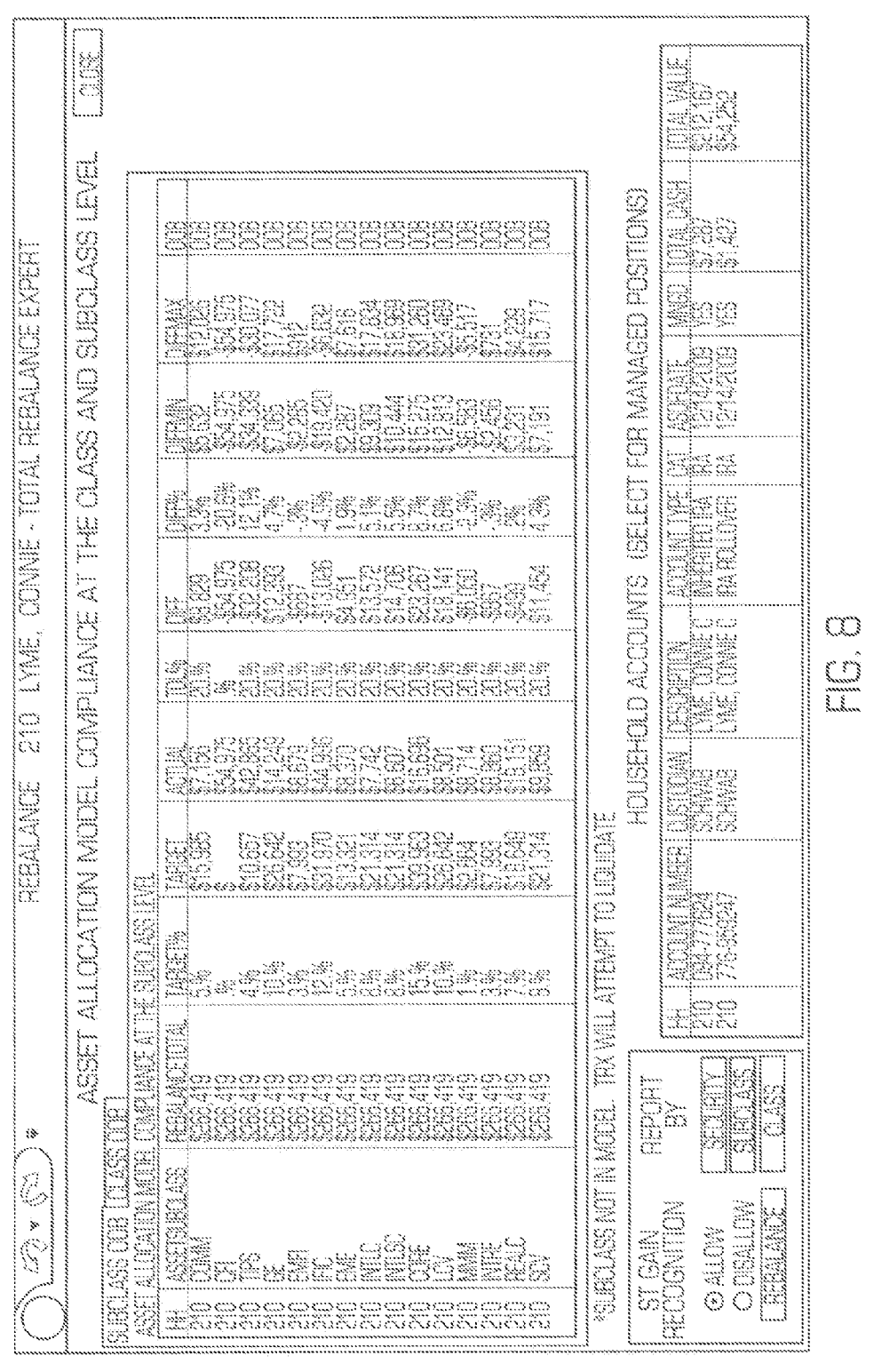

FIG. 6 illustrates an example of a global assumptions user interface of the analysis system and FIG. 7 illustrates an example of a global parameters user interface of the analysis system. These user interfaces allows a user of the system to adjust various parameters of the system including global assumptions (FIG. 6) and global parameters (FIG. 7). FIG. 8 illustrates an example of an asset allocation model compliance user interface of the analysis system that allows the user to quickly see the asset subclasses and/or classes of a particular portfolio and whether or nor the particular portfolio is in line with the asset subclass target percentages. The user interface in FIG. 8 also shows which asset subclasses are out of balance as shown in the far right column of the user interface.

Figure 9:
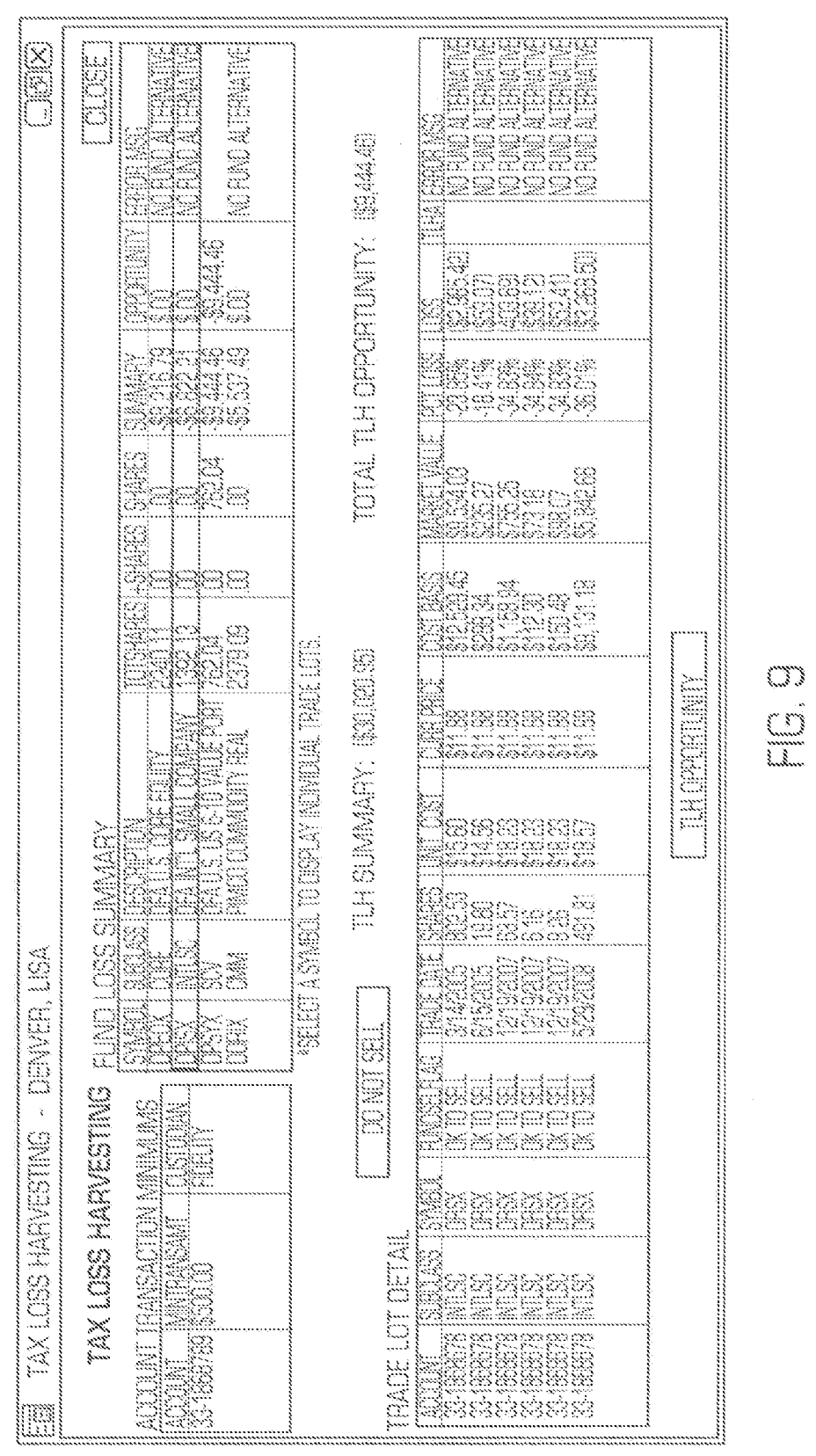
Figure 10:
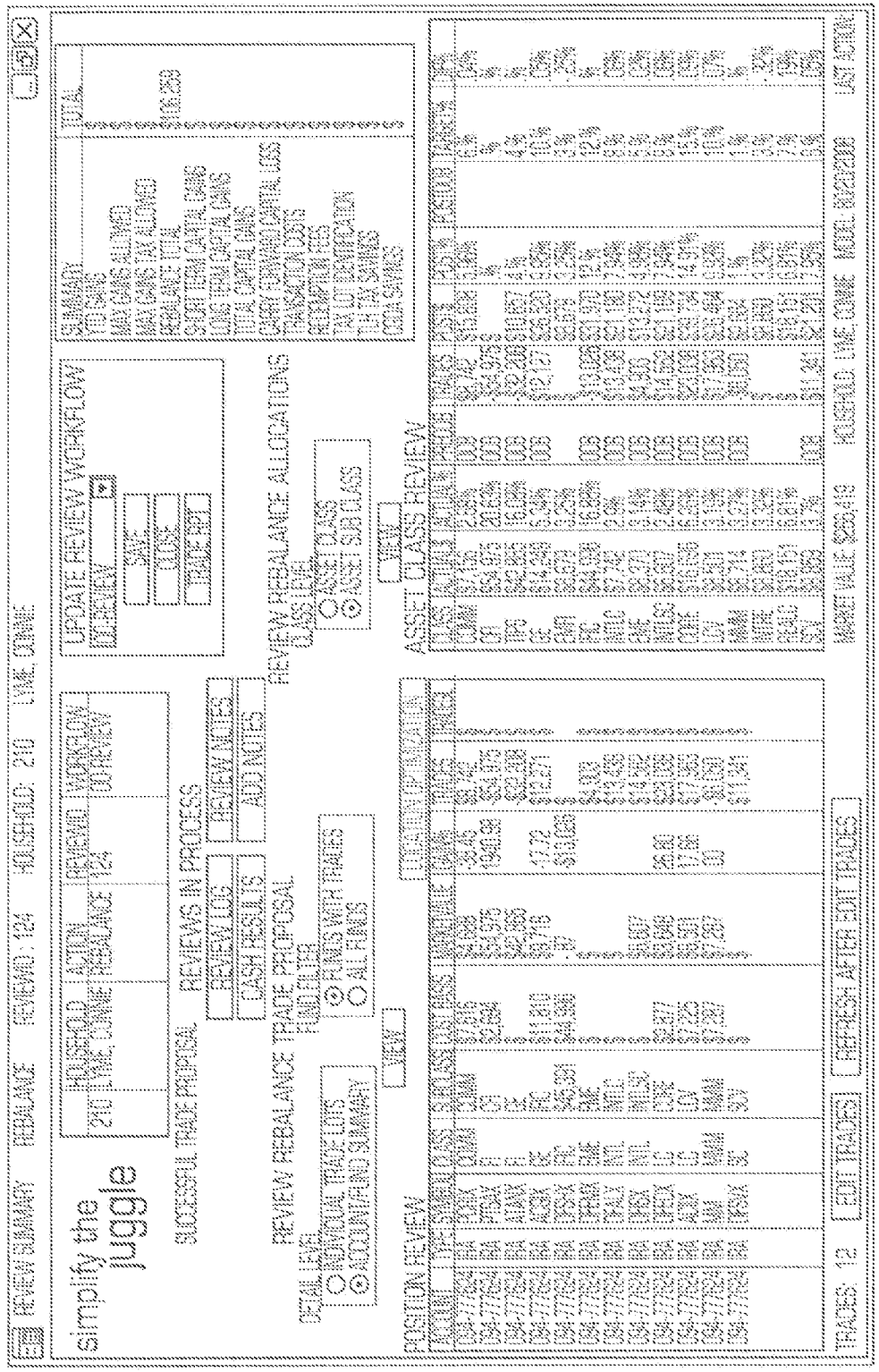
FIG. 10 illustrates an example of a particular client summary user interface of the analysis system.

FIG. 9 illustrates an example of a tax loss harvesting user interface of the analysis system that allows the user to quickly see the loss summary for a portfolio (shown with less detail in FIG. 1) as well as trade lot details. FIG. 10 illustrates an example of a particular client summary user interface of the analysis system that allows the user to view the overall household account for a client including a position review, an asset class review and the like.

Figure 12:
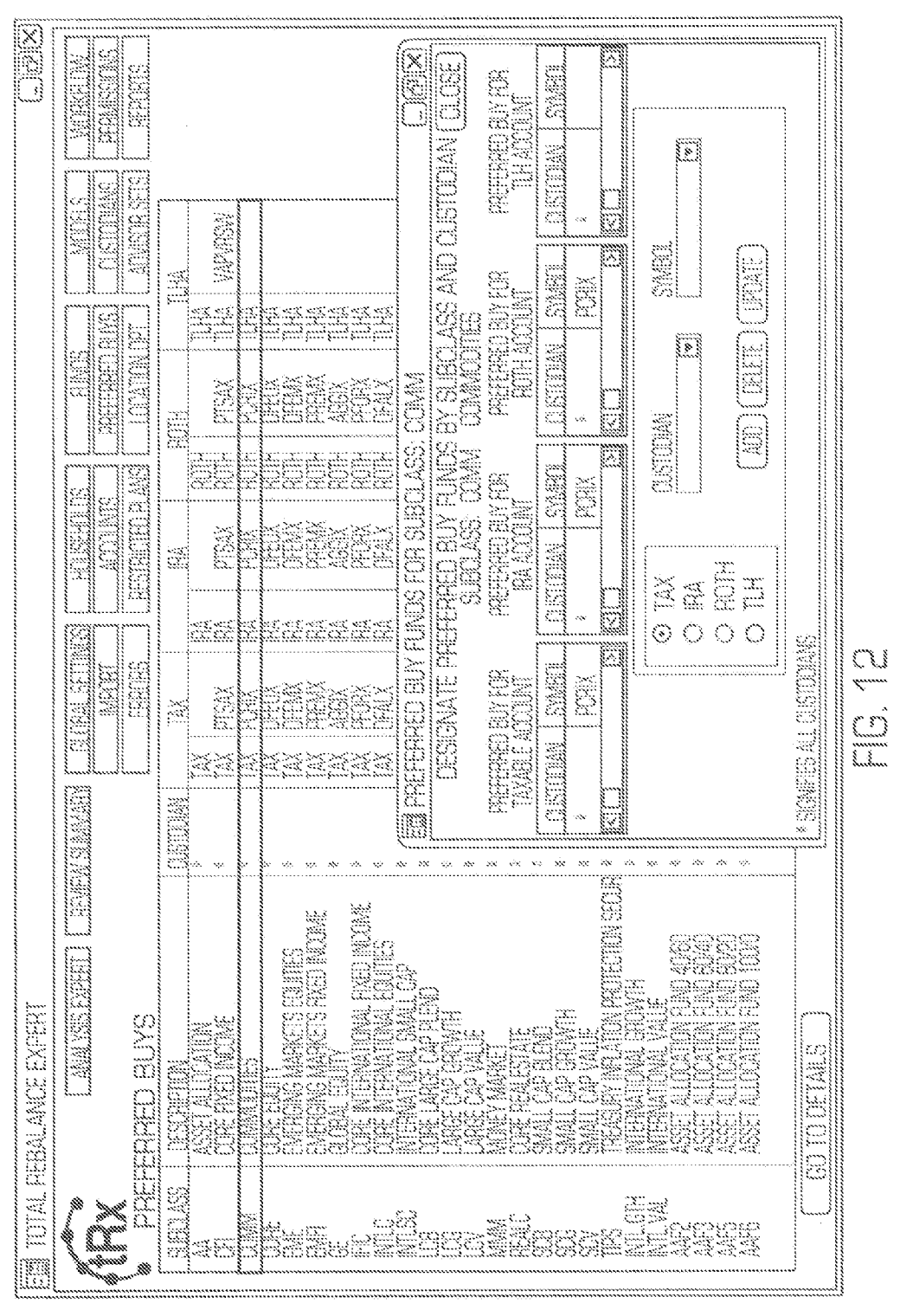

FIG. 11 illustrates an example of a location optimization user interface of the analysis system that allows the user of the system to adjust the sell and buy locations for the different asset classes of the system. FIG. 12 illustrates an example of a preferred buy user interface of the analysis system that allows the user of the system to adjust the preferred buy locations for the system.

Figure 13:
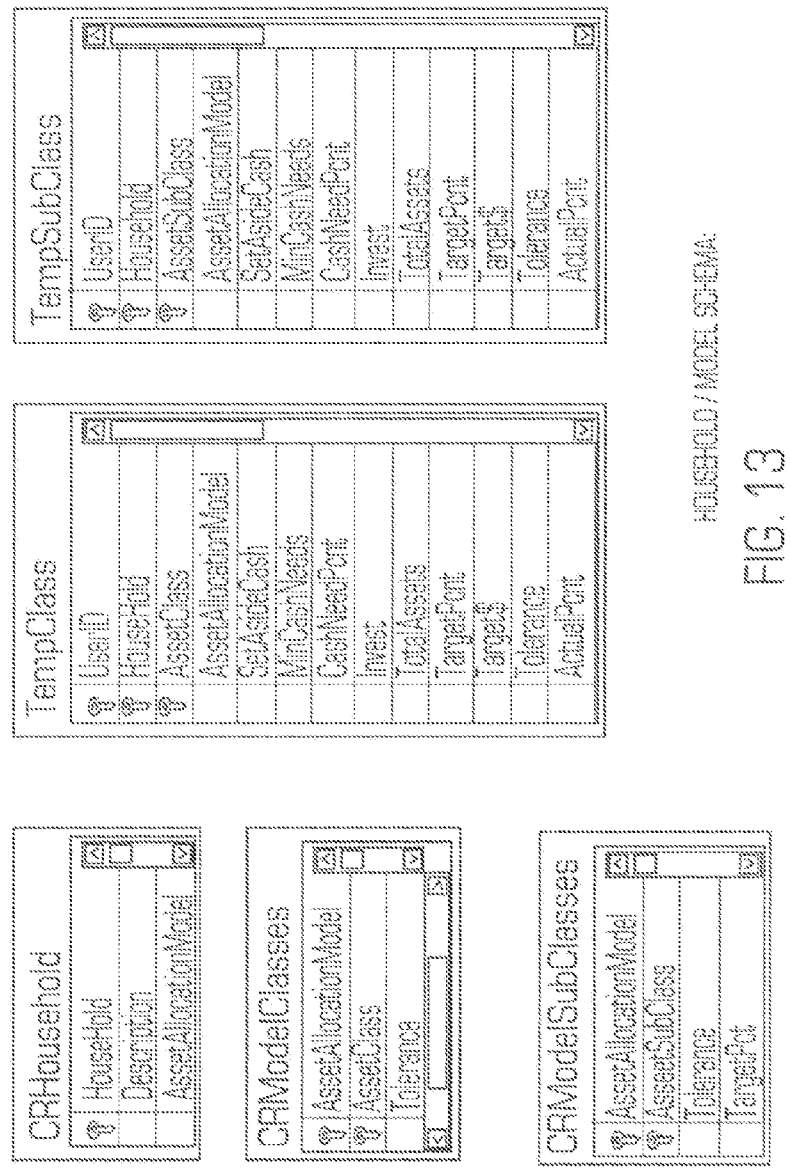
FIG. 13 illustrates an example of a household data schema of the analysis system.
Figure 14:
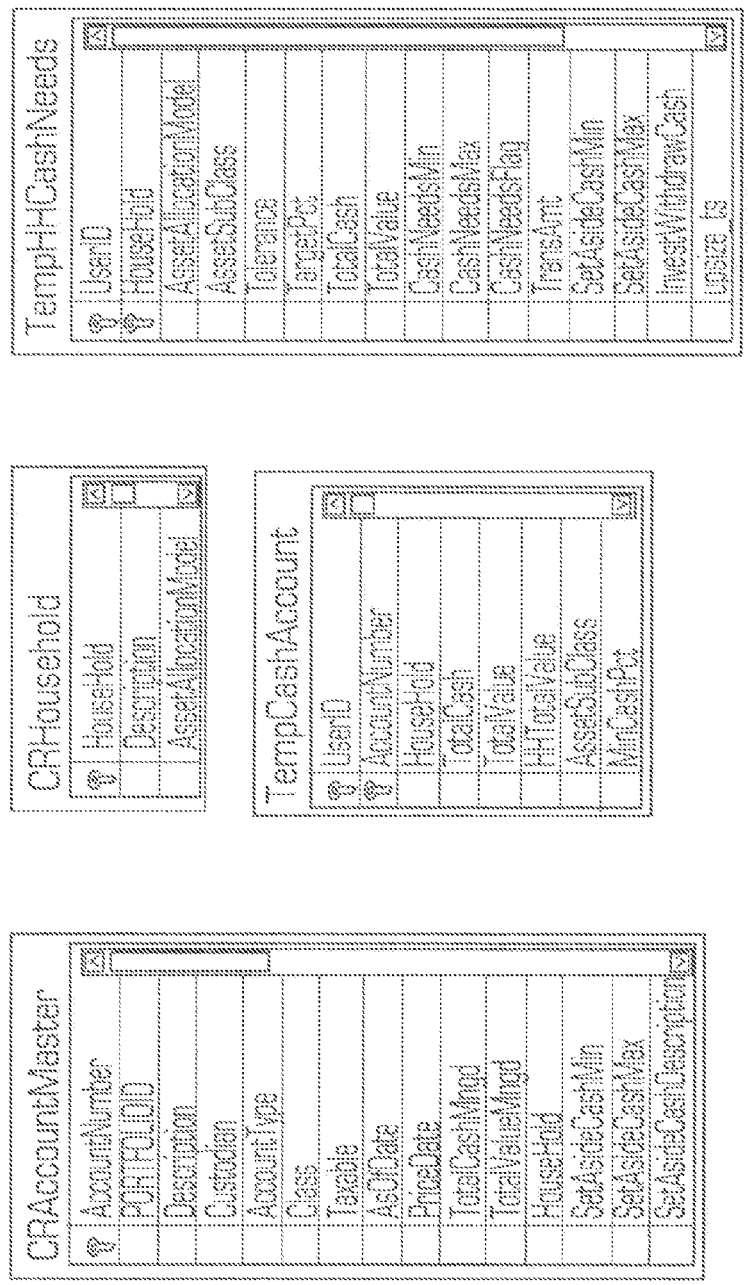
FIG. 14 illustrates an example of an account cash/household cash data schema of the analysis system.

FIG. 13 illustrates an example of a household data schema of the analysis system that stores the data for a household in one implementation of the system. The data stored in the household data schema is used as the parameters discussed above as well as for other data about the household. FIG. 14 illustrates an example of an account cash/household cash data schema of the analysis system that stores the data for an account cash/household cash in one implementation of the system. The data stored in the account cash/household cash data schema is used as the parameters discussed above as well as for other data about cash for the household and/or the account. FIG. 15 illustrates an example of a household/tax loss harvesting data schema of the analysis system that stores the data for the tax loss harvesting for a household in one implementation of the system. The data stored in the tax loss harvesting data schema is used as the parameters discussed above as well as for other data about cash for the household and/or the account.

A tax benefit report of the system shows future value and present value of tax benefits for a given time period based on savings generated during a given period. The benefits include tax lot identification, location optimization, tax loss harvesting and capital gain distribution avoidance.

In addition to the features described above, the analysis unit may provide the ability to choose blocks of clients for actions (instead of the single client as described above). The user interface of the analysis expert may also indicate work flow location (Review Level 1, Review Level 2, Hold, Trade, etc.) Thus, because the system allows multiple users in the firm to use the system, a reviewer can look at the analysis expert user interface and instantly see if he/she has a trade to approve before sending it onto the next person. The analysis unit also allows the user to sort by name of client (alphabetical) or by value of portfolio (highest first or lowest first). The analysis unit can also filter results by entering one or more letters into a filter box. For example, if you enter "S", the analysis expert will only display households beginning with the letter "S."

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for portfolio management analysis, comprising:
   one or more computing devices;
   an analysis unit, wherein the analysis unit comprises at least a computer processor which, when executed, performs a method, the method comprising;
   storing a plurality of sets of portfolio data, each set representing portfolio data for a client of a user and having a plurality of classes of investments, a plurality of values for each investment in each class, a plurality of subclasses of investments, a plurality of values for each investment in each subclass, a target value for each class, and a target value for each subclass;
   calculating a plurality of change indicators for each set of portfolio data, wherein the plurality of change indicators are an out of balance indicator for each class and subclass of investment, a cash need indicator, a cash to invest indicator, and a tax loss harvesting opportunity indicator;
   generating a user interface that displays, simultaneously, the plurality of change indicators for each of the plurality of sets of portfolio data assigned to the user and an action button for each of the plurality of change indicators; and
   selecting at least one of the action buttons on the user interface, wherein the selecting performs an automatic rebalance of the portion of the at least one selected portfolio according to redefined parameters set by the user and the client.

2. The system of claim 1, wherein the out of balance indicator for each class and each subclass in each portfolio is based on the plurality of classes of investments, the plurality of values for each security in each class, the plurality of subclasses of investments, the plurality of values for each security in each subclass, the target value for each class and the target value for each subclass.

3. The system of claim 2, wherein the out of balance indicator for each class and subclass further comprises one of an out of balance value for each class and subclass in the each portfolio, an out of balance percentage for each class and subclass in the each portfolio and an indicator of an out of balance condition.

4. The system of claim 1, wherein the one or more change indicator further comprises and an error indicator.

5. The system of claim 4, wherein each change indicator further comprises one of a component value, a component percentage and an indicator of a component condition.

6. The system of claim 3, wherein the analysis unit calculates a sum in dollars for each class of securities that exceed the target for the class and that fall short of the target for the class, identifying a largest sum as an out of balance by Class value that is displayed as the class out of balance value.

7. The system of claim 3, wherein the analysis unit calculates a sum in dollars for each subclass of securities that exceed the target for the subclass and that fall short of the target for the subclass, identifying a largest sum as an out of balance by subclass value that is displayed as the subclass out of balance value.

8. The system of claim 3, wherein the analysis unit automatically recalculates the out of balance value and out of balance percentage for each portfolio of all clients of the user when the plurality of values for each security in each class, the plurality of values for each security in each subclass, the target value for each class and the target value for each subclass changes.

9. The system of claim 1, wherein the analysis unit generates a tax benefit report.

10. The system of claim 1, wherein the analysis unit receives well formed portfolio data for a client.

11. A method for portfolio management analysis using one or more computing devices and a computer analysis unit that is capable of being connected to the one or more computing devices, the method comprising:
    storing, in a store unit of a computer analysis unit, a plurality of sets of portfolio data for each client of a user, each set of portfolio data having a plurality of classes of investments, a plurality of values for each security in each class, a plurality of subclasses of investments, a plurality of values for each security in each subclass, a target value for each class and a target value for each subclass;
    calculating, by a processor of the computer analysis unit, one or more change indicators for each set of portfolio data, wherein the plurality of change indicators are an out of balance indicator for each class and subclass of investment, a cash need indicator, a cash to invest indicator, and a tax loss harvesting opportunity indicator;
    generating, by the processor of the analysis unit, a user interface that displays, simultaneously, the plurality of change indicators for each of the plurality of sets of portfolio data assigned to the user and an action button for each of the plurality of change indicators; and
    selecting at least one of the action buttons on the user interface, wherein the selecting performs an automatic rebalance of the portion of the at least one selected portfolio according to predefined parameters set by the user and the client.

12. The method of claim 11, wherein the out of balance indicator for each class and each subclass in each portfolio is based on the plurality of classes of investments, the plurality of values for each security in each class, the plurality of subclasses of investments, the plurality of values for each security in each subclass, the target value for each class and the target value for each subclass.

13. The method of claim 12, wherein the out of balance indicator for each class and subclass further comprises one of an out of balance value for each class and subclass in each portfolio, an out of balance percentage for each class and subclass in each portfolio and an indicator of an out of balance condition.

14. The method of claim 11, wherein the one or more change indicator further comprises an error indicator.

15. The method of claim 14, wherein each change indicator further comprises one of a component value, a component percentage and an indicator of a component condition.

16. The method of claim 13 further comprising calculating a sum in dollars for each class of securities that exceed the target for the class and that fall short of the target for the class and identifying a largest sum as an out of balance by Class value that is displayed as the class out of balance value.

17. The method of claim 13 further comprising calculating a sum in dollars for each subclass of securities that exceed the target for the subclass and that fall short of the target for the subclass and identifying a largest sum as an out of balance by subclass value that is displayed as the subclass out of balance value.

18. The method of claim 13 further comprising automatically recalculating the out of balance value and out of balance percentage for each portfolio of all clients of the user when the plurality of values for each security in each class, the plurality of values for each security in each subclass, the target value for each class and the target value for each subclass changes.

19. The method of claim 11 further comprising generating a tax benefit report.

20. The method of claim 11 further comprising receiving well formed portfolio data for a client.

* * * * *